April 27, 1965     M. G. H. GIRODIN     3,180,159
WOBBLER MECHANISM
Filed April 4, 1963     2 Sheets-Sheet 1
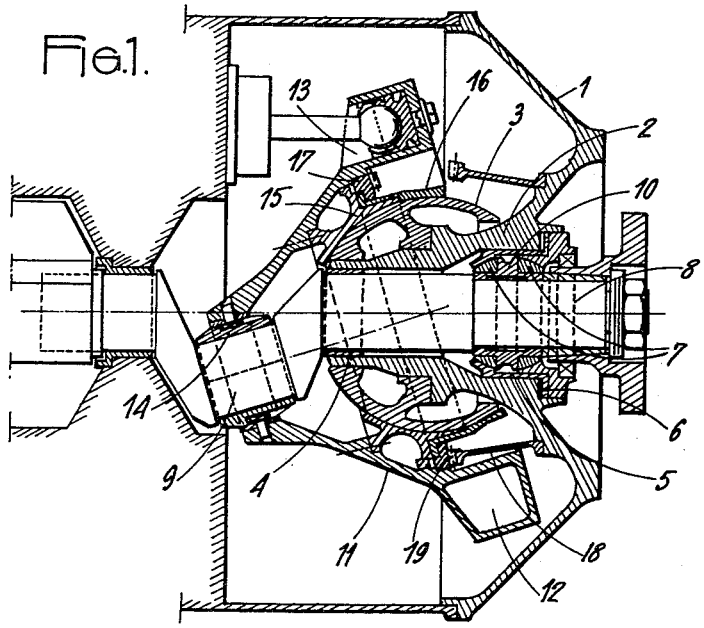
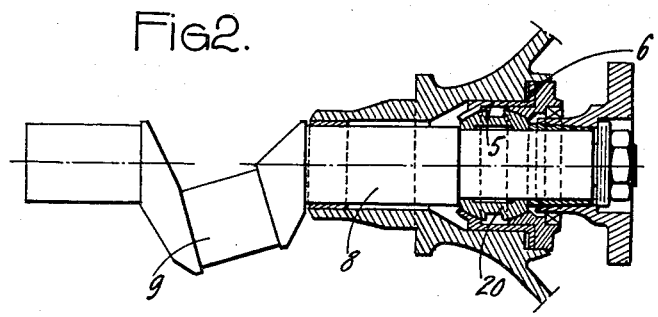
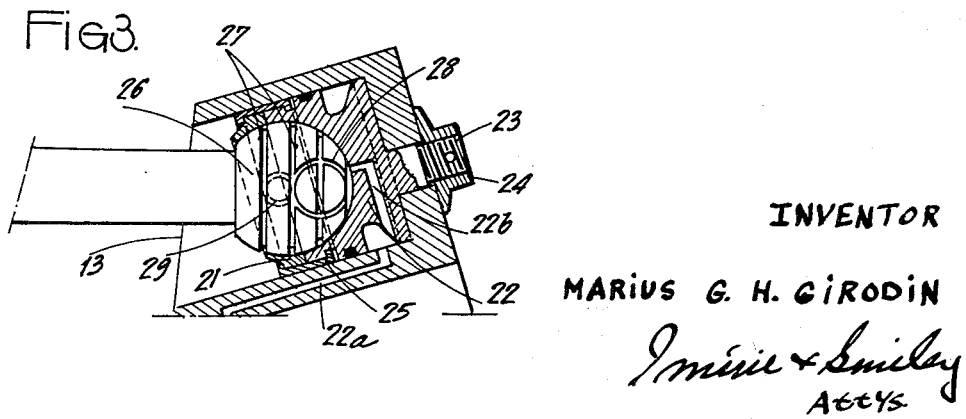
INVENTOR
MARIUS G. H. GIRODIN April 27, 1965

M. G. H. GIRODIN 3,180,159

WOBBLER MECHANISM

Filed April 4, 1963

INVENTOR
MARIUS G. H. GIRODIN
Attys.

3,180,159
WOBBLER MECHANISM
Marius Georges Henri Girodin, 18-20 Place de la
Madeleine, Paris 8, France
Filed Apr. 4, 1963, Ser. No. 270,602
Claims priority, application France, Apr. 12, 1962,
894,226, Patent 1,332,574
3 Claims. (Cl. 74—60)

The invention relates to a wobbler mechanism for barrel engines formed by a swivel joint fixed within the casing, an oblique pin single crank pin crankshaft traversing the swivel joint and a movement transformer moved with a luffing movement by the crank pin to move the connecting rod heads in the barrel engine cylinder.

According to the invention, the device is formed by a central hollow fixed sphere held by a spindle integral with a supporting part, a spherical race, mounted on the aforesaid hollow sphere, supports the movement transformation part which carries, at its outer or rear part, a hollow torus having cavities cooperating with the connecting rod heads and a toothed crown cooperating with a second toothed crown carried by the spindle. The crankshaft passing through the spindle comprises a pin whose longitudinal axis passes through the center of the hollow sphere and rests in a bearing assembled in the front part of the movement transformation part.

Various other characteristics of the invention will moreover be revealed by the detailed description which follows.

Forms of embodiment of the purpose of the invention are shown, by way of example, in the attached drawings.

FIGURE 1 is an axial section of a mechanism with a spherical bearing race extended.

FIGURE 2 is an alternative of the crankshaft provided with its double abutment bearing.

FIGURE 3 is an elevation-section on a larger scale of a connecting-rod head.

Figure 4:
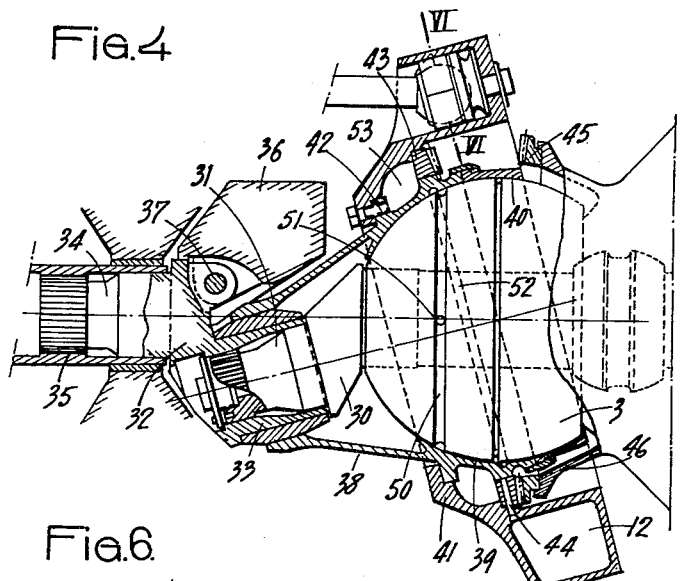
FIGURE 4 is a section showing another form of embodiment of the device comprising an extended torus, the mounting of a retaining gearing and the axial immobilisation of the movement transformer.

In FIGURE 1, the bottom of the casing 1 carries a spindle 2 on to which is fixed a hollow sphere, or swivel-joint 3, forming the central element around which the movement occurs. A bearing 4 is mounted at the end of the spindle 2 and a race 5 placed at the opposite end of the bearing 4 in the spindle 2 carries a double abutment bearing 7. The race 5 can be adjusted by means of a wedge 6.

The oblique crank pin 9 on shaft 8 is provided with a double-faced collar bearing 10. The regulating of the race 5 by the wedge 6 allows the axis of the pin 9 to be passed through the center of the hollow male sphere 3 forming the central element of the swivel-joint. In general, the oblique pin 9 of the shaft has a length equal to one and a half times its diameter.

The movement transformer 11 is conoidal and has the shape of a frustum of a cone. This part comprises a torus 12 close to its large base, hollowed and having cavities 13 for housing connecting-rod heads, described hereafter. The small base of movement transformer 11 carries a bearing 14 made in two parts. The diameter of the housing of this bearing is such that the shaft can pass through it. The movement transformer 11 contains a spherical bearing race 15 which is suitably centered, held and fixed inside this transformer. The race 15 accommodates a circular part 16 forming the spherical retaining race on the hollow sphere 3.

A toothed crown, or ring 17, integrally fastened to the movement transformer 11, is fixed just outside the bearing races and spherical retainer 15, 16 and inside the torus 12. The teeth of ring 17 cooperate with a truncated part 18 carrying a ring of teeth 19, the truncated part 18 being fixed, by its small base, on the foot of the spindle 2.

The appliance works in the following manner:

When the shaft 8 is rotatively driven, its movement drives the pin 9 whose axis describes a cone having its summit in the centre of the sphere 3. Thus, the movement transformer 11 integral with the pin 9 by means of the bearing 14 can revolve by means of the teeth 17 along the teeth 19, which causes a reciprocating movement of the heads of the connecting-rods housed in the cavities 13 of the torus 12.

It may be advantageous in certain machines to limit the length of the spindle 2 so that it simply holds the swivel-joint 3 and to mount the bearing 4 directly in this swivel-joint.

In FIGURE 2, the oblique pin 9 on shaft 8 is identical with that shown in FIG. 1. This also applies to race 5 held by the wedge 6, but the parts 7 and 10 of FIG. 1 are replaced by a spherical part 20 revolving directly in the female spherical elements inside the race 5.

FIGURE 3 shows, in a cylindrical cavity 13, a swivel-joint bearing 22 extended by a stem 23. The braked nut 24 locks the swivel-joint race 22 in the end of the cavity 13. We shall see that the stem 23 is off-centered in relation to the cavity 13 so as to prevent any rotation of the swivel-joint race 22.

The swivel-joint of the connecting rod head 26 can thus luff between the swivel-joint race 22 and the holding part 21 which is fixed on the swivel-joint race by a double collared two-part ring 25. The swivel-joint race-holding part and ring assembly is centered in the cavity 13.

The oil reaching the pole of the swivel-joint race 22 through the ducts 22a and 22b comes to the pole of the swivel-joint 26 where it is distributed in the normal grooves 27 of the spindle, by small-circle grooves 28 and 29, so that it can circulate throughout the grooves and escape through the small circle of the swivel-joint race 21.

In FIG. 4, the shaft 30 is mounted in an internal bearing and an output bearing comprising a double abutment placed inside the central sphere 3. The shaft 30 is terminated by an oblique spindle 31 of appreciably truncated shape and whose large base is integral with the crank-pin of the shaft 30, whereas the small base has flutings rotatively immobilising, in relation to the shaft 30, the other part 32 of the crankshaft formed by the oblique pin 33, inside of which the spindle lock 31 is adjusted. In the example shown, the element 32 which is removable, terminates by the spindle 34 carrying flutings enabling the hollow connecting shaft 35 to be fixed. 36 denotes a counterpoise mounted on the element 32 by means of a spindle 37.

The frustrum cone 38 of the movement transformer is fastened integral with the spherical bearing 39 prolonged by the spherical retaining ring 40. We thus obtain a spherical race containing the sphere 3. The external torus 12 is attached to the assembly 38-39 by the intermediate frustrum cone 41, fixed by screws 42. The mobile toothed crown 43 which is centered in the assembly 12-41 rests against the spherical bearing race 39, and is fixed on the components 12-41 by radial spindles 44. The fixed crown 45 is held against the frustrum cone 46 which is integral with the base of the end spindle.

This device operates in exactly the same manner as that shown in FIG. 1.

Figure 5:
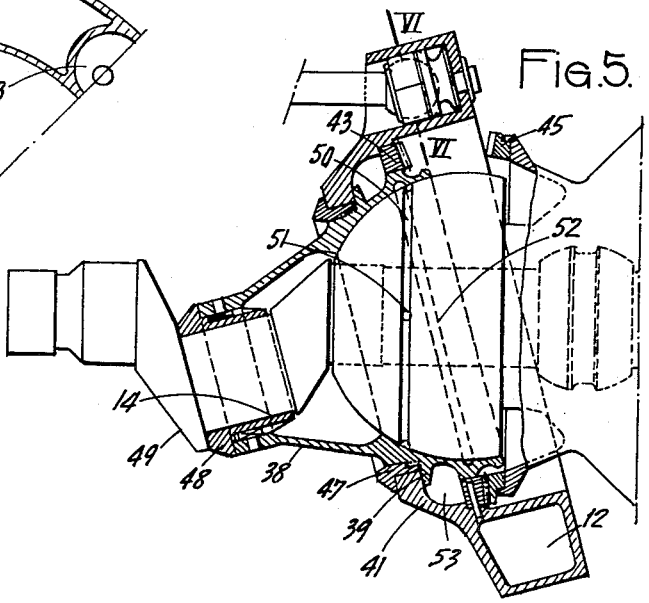
FIGURE 5 is an axial section of a third form of embodiment of the device showing a mounting of the extended torus and the axial retaining abutment of the movement transformer.

In FIG. 5, the external torus 12 assembly and its connecting frustrum cone 41 is fixed on the elements 38–39 forming the central part of the movement transformer, by the nut 47 screwed on to the part 39 bearing the rear retaining collar. In this embodiment, the spherical race 39 does not comprise a spherical retaining ring. The movement transformer is axially retained by the abutment 48 integral with the bearing 14 and pressing on the interior of the faced side of the crank-pin 49.

The mobile toothed crown 43 and spindle 45 are mounted as in the example shown in FIG. 4.

In FIGS. 4 and 5, the fixed central sphere 3 has a groove 50 communicating by holes 51 with the interior of the swivel-joint. The spherical bearing race 39 has a secant groove 52 of the fixed groove 50, so that by the holes, this groove 50 communicates with the container 53 from which start the lubricating ducts for the connecting-rods.

Figure 6:
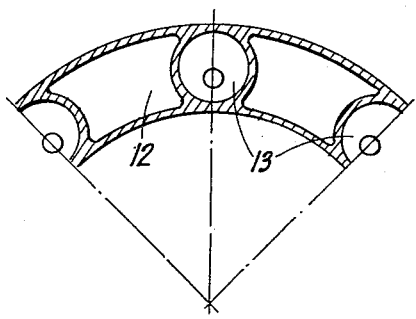
FIGURE 6 is a section along, either the line VI—VI of FIG. 4, or the line VI—VI of FIG. 5.

In FIG. 6, which is a partial diametral section of the external torus 12, we clearly see how the cavities 13 are fixed in this torus.

The working of the assembly shown in FIG. 5 is identical to that described in FIG. 1.

The mechanism described above is most particularly applicable to thermic motors, compressors, pumps and similar objects.

Various modifications can moreover be applied to the forms of embodiment, given by way of examples, without going outside of the scope of the invention.

I claim:

1. A wobbler mechanism for a barrel engine, comprising a support casing having an opening, a hollow, partly cylindrical spindle integral with said support casing and forming said opening, a hollow spherical member mounted on said spindle, a movement transformer formed of three coaxial parts and mounted for swiveling movement on said spherical member, said parts including a conoidal member having an external hollow torus at its outer end provided with a series of cavities for cooperation with connecting rod heads, a spherical bearing race for engagement with said spherical member and a first toothed ring both within said conoidal member, fastening means separably securing said spherical bearing race and first toothed ring to said conoidal member, said conoidal member of the movement transformer being axially immobilized by a retaining spherical race mounted on said spherical member outwardly of said first spherical race and secured to the conoidal member by said fastening means, a crankshaft having an outer cylindrical end portion journaled in said spindle and including an oblique crankpin located inwardly of said spindle, a cylindrical bearing pivotally secured to the inner end of said conoidal part and journaling said crankpin, and a second toothed ring meshing with said first toothed ring, said second toothed ring being integral with one edge of a truncated cone whose base opposite to said one edge is secured to a portion of said spindle.

2. A mechanism according to claim 1, wherein said crankshaft comprises a keyed inner end portion coaxially aligned with said outer end portion for separable engagement with an internal rotatable shaft; an angled portion outwardly of said inner portion disposed at the same angle to the crankshaft as the axis of said oblique crankpin and means separably clamping said angled portion and crankpin together in a manner which allows dismounting of the crankpin and outer end portion of the crankshaft in an outward direction along said crankpin axis.

3. Mechanism according to claim 1, characterized in that each of said cavities in said hollow torus is cylindrical and seats a spherical bearing for a connecting rod head, each said spherical bearing being formed of two parts assembled together by a ring in two parts provided with internal collars, each female assembly thus formed being centered in its cavity and retained by an off-centered stem fastened to the torus through an opening in its wall off center with respect to the axis of the cylindrical cavity.

References Cited by the Examiner

UNITED STATES PATENTS

| 1,772,631 | 8/30 | Mead | 75—598 |
| 1,908,071 | 5/33 | Snyder | 74—598 |
| 2,332,105 | 10/43 | Neuland | 123—41.44 |
| 2,845,290 | 7/58 | Latzen | 287—90 |
| 2,912,267 | 11/59 | Latzen | 287—90 |
| 2,968,961 | 1/61 | McGregor | 74—60 |
| 3,014,767 | 12/61 | Thrasher et al. | 308—72 |
| 3,016,273 | 1/62 | Benoit | 308—72 |

FOREIGN PATENTS 1,087,864  10/43  Germany.

BROUGHTON G. DURHAM, *Primary Examiner.*